United States Patent [19]
Dworschak

[11] 4,299,193
[45] Nov. 10, 1981

[54] STEAM-GENERATING PROCESS
[75] Inventor: Josef Dworschak, Munich, Fed. Rep. of Germany
[73] Assignee: Linde Aktiengesellschaft, Wiesbaden, Fed. Rep. of Germany
[21] Appl. No.: 152,033
[22] Filed: May 21, 1980
[30] Foreign Application Priority Data
  May 22, 1979 [DE] Fed. Rep. of Germany ....... 2920661
[51] Int. Cl.³ .............................................. F22B 31/00
[52] U.S. Cl. ..................................................... 122/7 R
[58] Field of Search ...................... 122/7 R, 1 C, 20 B, 122/421

[56] References Cited
U.S. PATENT DOCUMENTS

| | | | |
|---|---|---|---|
| 3,106,192 | 10/1963 | Hingst | 122/7 R |
| 3,202,134 | 8/1965 | Marcheix | 122/7 R |
| 3,420,212 | 1/1969 | Knizia | 122/1 C |
| 4,024,903 | 5/1977 | Yamada et al. | 122/7 R |
| 4,026,352 | 5/1977 | Andoniev et al. | 122/7 R |
| 4,182,275 | 1/1980 | Gibson | 122/7 R |
| 4,184,325 | 1/1980 | Mandrin | 122/7 R |
| 4,188,916 | 2/1980 | Csathy et al. | 122/7 R |

*Primary Examiner*—Henry C. Yuen
*Attorney, Agent, or Firm*—Karl F. Ross

[57] ABSTRACT

A process for generating steam with sensible low-temperature waste heat wherein preheated feed water is expanded in a succession of pressure stages after picking up the sensible heat from the fluid carrying the waste heat, and the vapor generated in each stage by the expansion is saturated, compressed to the pressure of the next higher pressure stage and then admitted thereto, i.e. combined with the steam of this next higher stage. The system allows waste heat recovery from low temperature heat carriers where this waste heat was discarded in the past.

12 Claims, 4 Drawing Figures

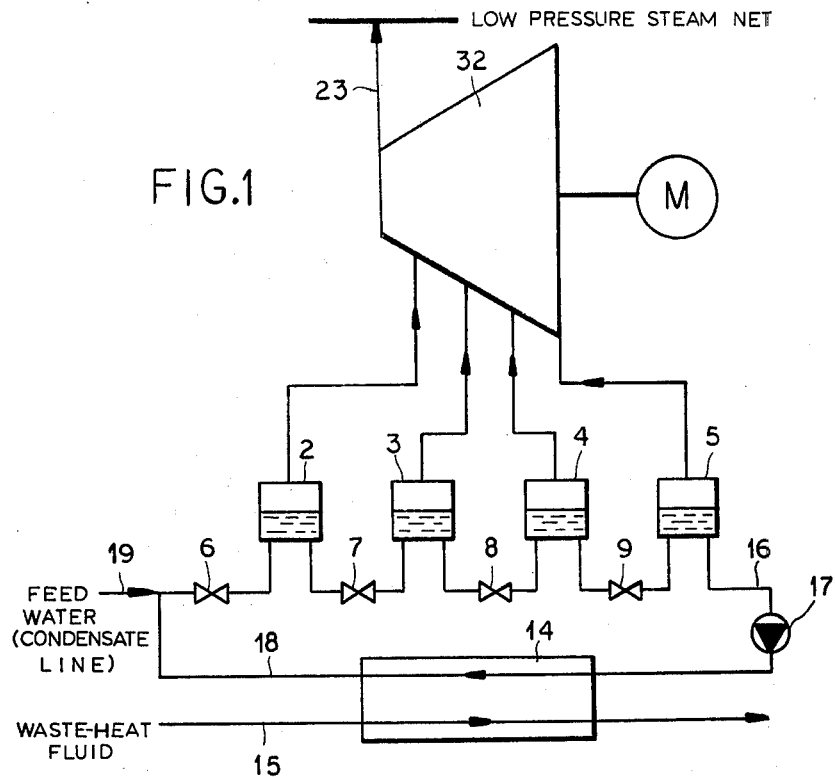
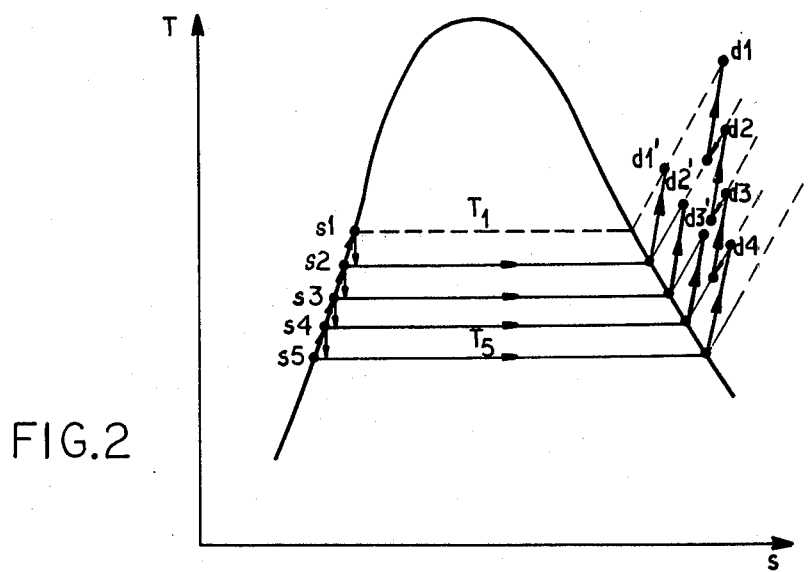

4,299,193

STEAM-GENERATING PROCESS

FIELD OF THE INVENTION

My present invention relates to a method of generating a steam utilizing sensible low-temperature waste heat of a fluid.

BACKGROUND OF THE INVENTION

In various industrial, chemical, metallurgical and heating processes, waste heat carrying fluids at a temperature of above 150° C. can be effectively subjected to waste heat recovery, e.g. in so-called waste heat boilers, to produce low pressure steam. The steam can be used as process steam for a variety of purposes and as a heat-exchange fluid for plant heating and other purposes.

However, when a fluid is obtained at a lower temperature level as a carrier of the waste heat, the waste heat has not been effectively recovered in most instances and because this small amount of thermal energy is not readily recoverable, e.g. because there are few consumers of such low temperature heat, the waste heat is discharged and represents an energy loss.

Experience has shown that direct use of fluids at temperatures below 150° C. as heating sources is difficult and seldom practical.

Obviously the low temperature fluids which still contain significant sensible heat can represent a valuable energy source if this heat can be recovered in a practical manner and in a readily usable fashion.

OBJECTS OF THE INVENTION

It is an object of the present invention to provide a steam-generating method which operates with a high degree of efficiency and allows recovery of low temperature sensible waste heat and, more specifically, is capable of producing steam at a temperature above the temperature of the waste heat fluid.

Another object of the invention is to provide a waste heat recovery system that operates with good efficiency even with low temperature waste heat carriers.

SUMMARY OF THE INVENTION

I have found that it is possible to effectively recover sensible heat from a waste heat carrier, namely, a fluid at relatively low temperature (say below 150° C.) and yet generate steam at a temperature above that of the fluid so that the generated steam can be utilized in any one of numerous applications in a plant or the like, by heat exchange with the fluid at an elevated pressure of a feed water.

Thereafter, the feed water is subjected to expansion in a succession of pressure stages, i.e. to flash evaporation in a number of stages in succession, at different pressure levels so that in each stage, saturated steam is generated. The saturated steam from each stage is then compressed to the pressure of the next higher stage and fed into this stage or combined with the steam thereof at the higher pressure to which the steam has been compressed.

By this process, all of the steam is eventually brought to the final desired steam pressure, i.e. the pressure at which the generated steam is utilized or supplied to a consumer thereof.

The present invention is thus based upon a reversal of the approach taken in the regenerative preheating of feed water for steam power installations. In such systems, steam is work expanded to successive pressure levels and condensed in contact with feed water which is to be heated whereby the latent heat of condensation is transformed into a temperature rise of the feed water. In the system of the present invention, the temperature of the feed water and the thermal energy stored therein is converted to latent heat of evaporization with contribution to the energy of evaporization by the transformation of potential energy of the feed water under pressure to kinetic energy, thereby providing steam which ultimately is at a higher temperature than the waste heat carrier utilized to preheat the feed water.

In the system of the present invention, the waste heat fluid continuously drops in temperature as heat is transferred to the pressurized feed water and for a given means temperature between the upper and lower temperature during the heat transfer, heat transfer efficiency is found to be relatively high, i.e. there is little if any loss during the heat transfer to the feed water. It is thus possible to recover efficiency heat from heat carriers at temperatures below 150° C. and to produce low pressure steam which, as a working fluid, can be supplied to or utilized in a low pressure steam network at a given pressure and temperature, the latter being above that of the fluid.

Most effective utilization of the low temperature waste heat provides that two or more waste heat recovery units of the type described, operating independently of one another, are provided.

When two or more such waste heat recovery systems are provided, it is possible to discontinue the operation of one and even utilize it for waste heat recovery from another fluid, while the other remains effective for the recovery of waste heat from the first heat carrying fluid.

The system of the present invention, aside from providing an economical and versative recovery of thermal energy, also eliminated problems with discharging the heat carrying fluid into the environment. In the past, although the thermal energy of low temperature fluids could not be recovered efficiently, there nevertheless was a problem involved in discharging this fluid which was usually subjected to water cooling before being released into the environment.

With the system of the present invention, however, a sufficient amount of heat can be extracted from the heat carrier so that it can be discharged into the atmosphere without the high expense and complexity of water cooling.

Another surprising feature, however, of the instant invention is that a plant for waste heat recovery by the principles of this invention has a long useful life, because waste heat utilization portion is separated from the portion traversed by the original heat-carrying fluid and wear, corrosion and maintenance costs are sharply limited.

According to another feature of the invention, any water which does not evaporate upon the expansion in a respective stage is brought to an elevated pressure and after further heat exchange with the heat-carrying fluid is again expanded.

This process technique has been found to be sufficiently effective for the use of a waste heat in the cooling of a pressureless fluid.

A portion of the water is circulated continuously and the amount of water is replenished by the equivalent to the amount which evaporates. The ratio between the amount of water which is evaporated to the amount which is circulated in liquid form is 1:8 for example. Preferably the pressure is so chosen that during the heat exchange no vaporization occurs and the preheated feed water can be recycled to the highest pressure stage. This eliminates the possibility that vapor block will form along the fluid paths.

According to another feature of the invention, the water is subjected to heat exchange in at least two pressure stages with cooled fluid from another pressure stage or with uncooled fluid at a higher pressure.

This process is primarily designed for fluids which are obtained under pressure. By contrast with the previously described process, in this case the water is brought into heat exchange in at least two, advantageously all, pressure stages with the heat-carrying fluid so that the waste heat directly vaporizes the water of the several stages.

In this aspect of the invention it is preferred to feed to the highest pressure stage only a quantity of water equal to the vapor generated in all of the pressure stages.

According to the invention, the steam generated in each pressure stage is compressed to the pressure of the next higher pressure stage. In order to keep the power required for compression as low as possible, the steam prior to compression is saturated. This can be effected in one embodiment of the invention by spraying water into the steam compartment of a particular stage. The sprayed water can be water at an elevated pressure in the system ahead of a point at which this water is subjected to multistage expansion.

It has been found to be advantageous to compress the steam from all of the expansion stages in individual compressor stages all of which are driven by a common shaft from a single motive source. For example, the turbine drive can be a gas turbine or a diesel engine. When the heat of the diesel engine, for example, is also utilized for the generation of steam and/or for preheating the feed water of at least one pressure stage, the efficiency of the process can be further improved.

An apparatus for carrying out the method of the present invention thus can comprise a plurality of expansion stages, evaporators or boilers with the feed water being supplied to a first boiler and the latter having a steam outlet.

Advantageously, each boiler can also be connected to the next boiler below the steam compartment by a feed passage which admits the water to the next boiler for expansion therein to a lower pressure. The steam compartments of each boiler are connected through a respective compressor stage with the steam of the next compartment in the manner described, with all of the compressor stages being driven by a common shaft. Means is provided for recovering the engine heat, e.g. by connecting the cooling water system of the engine to at least one of the boilers whereby engine cooling water is drawn from a boiler at appropriate pressure and temperature and the heated engine water is delivered to a boiler at higher temperature. Furthermore, the exhaust gas of the engine can be passed in heat exchange with feed water or steam to further increase the efficiency.

While the system of the present invention is used preferably to generate low pressure steam for any ultimate purpose, it is also applicable to other vaporization fluids and can be provided in a closed system as a heat pump operable with varying waste heat, temperature and heat consumption levels.

BRIEF DESCRIPTION OF THE DRAWING

The above and other objects, features and advantages of the present invention will become more readily apparent from the following description, reference being made to the accompanying drawing in which:

FIG. 1 is a diagram illustrating principles of the invention and from which elements not important to a discussion of these principles have been omitted;

FIG. 2 is a T-s diagram illustrating these principles;

SPECIFIC DESCRIPTION

Figure 3:
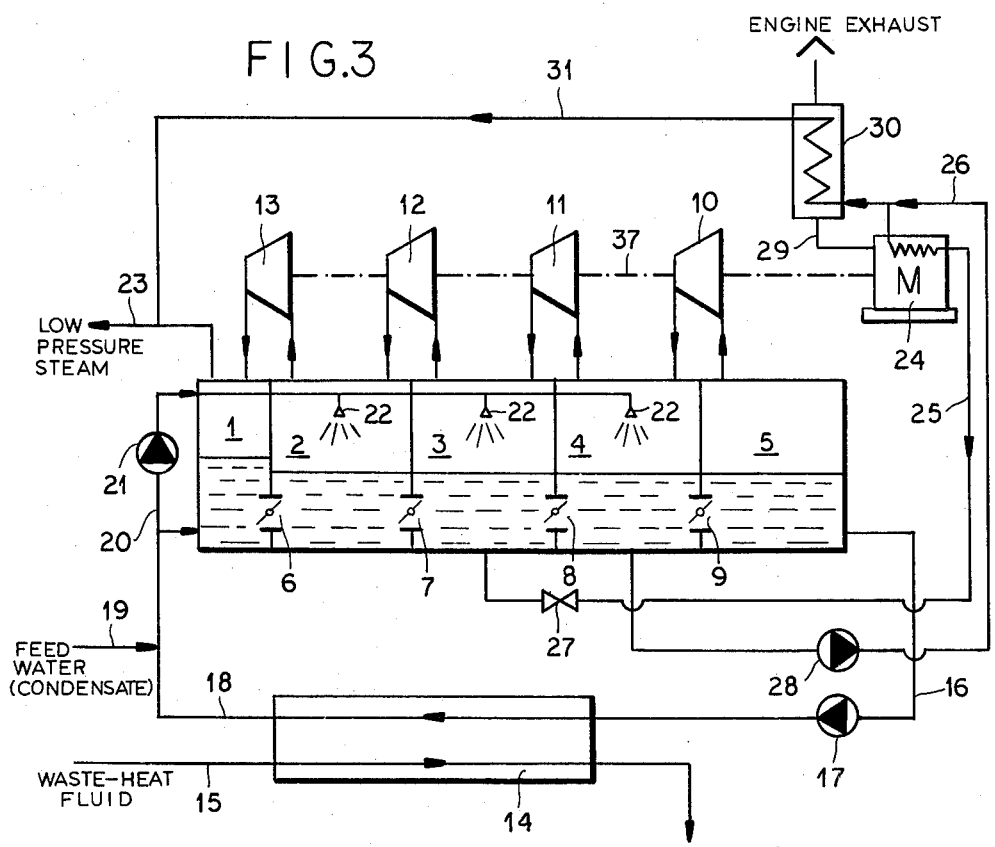
FIG. 3 is a flow diagram of a best mode embodiment for carrying out the invention in practice.

From FIG. 1 it will be apparent that a line 19 can deliver feed water to a boiler system in which the water is circulated by a pump 17 and a line 18, the boiler system comprising four boilers or evaporators 2, 3, 4, 5, each of which has a lower or sump zone receiving the water and an upper vapor zone into which the water evaporates.

These boilers are separated by valves 7, 8 and 9 which admit the water at the pressure of one boiler into the boiler of the next expansion phase. A valve 6 controls the feed of the water to the first boiler too.

A heat exchanger 14 enables the recirculating water to be passed in indirect heat exchange with a waste heat carrying fluid in line 15.

Each of the pressure stages can be provided with a steam-saturating spray head (not shown) which can be of the type described in connection with FIG. 3 and is connected to a respective stage of a compressor 32 driven by a motor M.

Each low pressure stage of the compressor feeds to the next higher pressure stage and the low temperature steam is recovered at 23.

The feed water under pressure is delivered at 19 in an amount equal to the quantity of water converted to steam as withdrawn at 23.

The water, heated by the heat carrying fluid, is initially introduced into boiler 2 in which a portion of the water evaporates. The remaining partially cooled water is delivered through valve 7 to boiler 2 from which it enters the second boiler 3 and expands therein to again generate vapor. The process is continued in the remaining two boilers 4 and 5 andf the cooled water is recirculated by pump 17 through the heat exchange 14, the pump 17 raising the pressure of the water to that of feedline 19 before the water enters the heat exchanger 17. Pressure stage 2 is thus at the highest pressure and pressure stage 5 is at the lowest pressure.

The steam withdrawn from boiler 5 is compressed to the pressure of the steam in boiler 4 and mixed therewith in the compressor. The steam mixture at this pressure is compressed to the pressure of the steam from boiler 3 and so on, until the product steam is obtained at 23 at a higher pressure than prevails in stage 2.

This operation will be more readily understood from a consideration of the T-s diagram of FIG. 2.

Water is heated in the heat exchanger 14 progressively from state s5 to state s1, thereby cooling the heat carrying fluid in the ideal case from the temperature $T_1$ to a temperature $T_5$.

By expansion of the water in stage 2, the state s2 is reached with the steam being compressed from the pressure d2 to the final pressure at line 23 which is d1.

By further stepwise expansion of the feed water, the states s3, s4 and s5 are reached with the pressure of each stage being built up to that of the next stage as shown at the right-hand side of the diagram. As is also clear from this diagram, all of the vapor is ultimately at the final pressure state d1 at which it can be introduced into the low-pressure steam network.

To produce the compressor load an intervening cooling can be effected (see FIG. 3) in which case the pressure buildup will correspond to the sequence d4, d3', d2', d1' as illustrated in FIG. 1.

FIG. 3 shows schematically a practical and best mode embodiment of the invention in which parts functionally equivalent to those of FIG. 1 have been given the same reference numerals. In addition this embodiment illustrates a specific example of the invention.

FIG. 3 represents a system which can be used wherever a high pressure steam network and a low pressure steam network are available in an industrial plant, more specifically, for the recovery of waste heat using feed water which is a condensate of the high pressure steam system. In this embodiment, therefore, the feed water picks up the waste heat from line 15 and is drawn from the condensate duct system of a steam network, the waste heat being transformed into low pressure steam which is supplied at 23 to the low pressure steam network.

A in the system of FIG. 1, the pressure stages 2, 3, 4 and 5 serve to allow expansion of preheated feed water to successive lower pressures and the production of saturated steam in each stage. The saturated steam from each lower stage 5, 4, 3 being compressed in a respective compressor stage 10, 11, 12 to the pressure of the next higher stage 4, 3, 2 and being fed by the respective compressor thereto. An additional compressor stage 13 is provided between the expansion stages 1 and 2 and all of the compressor stages are driven by a common shaft 37.

The heated water is introduced into the first boiler 1 and expands therein and passes through valves 6, 7, 8, 9, in succession, to the other pressure stages 2-5 for expansion and vapor generation in each stage.

The water from boiler 5, brought to the pressure line 19 by pump 17, is passed via line 18 through the heat exchanger 14 where it is heated with the heat-carrying fluid of line 15. When the latter is not a condensate, condensate from either of the steam networks can be used as the feed water 19 to which pressure the recirculated water is raised by the pump 17.

The compressor 10-13 has its shaft 37 driven by a diesel engine 24. A cooling water feedline 26 for the cooling system of this invention draws water at the appropriate temperature and pressure from the steam boiler 4, whereupon this water is partly heated and vaporized in the heat exchanger 30 to produce steam which is fed via line 31 to the product steam line 23. The other part of the cooling water serves to cool the engine 24 and is returned as preheated feed water via line 25 and valve 27 to the boiler 3. The heat required to vaporize the water from line 26 converted to steam in line 31 is obtained from the exhaust gas discharged at 29 from the engine 24.

Obviously the temperature and pressure in boiler 3 will be higher than the temperature and pressure in boiler 4 from which the engine cooling water is drawn. The heat exchanger 30 thus allows the exhaust gas heat of the engine to be recovered while the recirculation via pump 38 of the engine coolant as part of the feed water system allows engine heat to be recovered and converted to low pressure steam. Since the boiler 3 is at a lower pressure than the steam network to which line 23 is connected, valve 27 is an expansion valve allowing the cooling water to expand to the lower pressure.

A line 20 branched from the feed water inlet 19, representing a condensate line as mentioned earlier, feeds a pump 21 wich forces water through the spray heads 22 in the boilers 2, 3, and 4 to saturate the heated steam therein.

Figure 4:
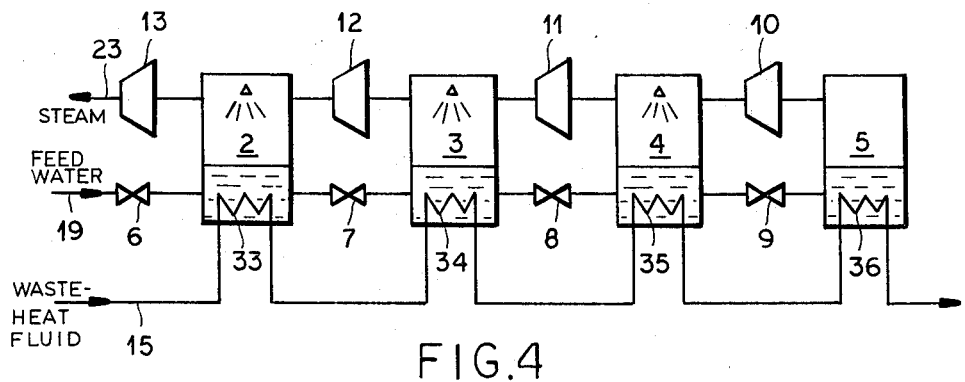
FIG. 4 is a flow diagram representing a modification of the system of FIG. 3.

In the embodiment of FIG. 4, the heat transfer to the water to be expanded in each stage differs from the heat transfer of FIG. 3 in that separate heating coils 33 through 36 from heat exchangers within each of the boilers 2-5 and heat-carrying fluid 15 is passed through these heat exchangers in series thereby being continuously cooled. The quantity of feed water supplied at line 19 to the first boiler 2 is equal of course to the quantity of steam delivered at 23 under standard conditions.

With a heating fluid whose temperature is reduced from 150° C. to 80° C. in the apparatus of FIG. 3 with four-stage compression and a stage efficiency of 0.85 and with heat transfer in the heat exchanger 14 with a mean temperature difference of 10° K., a ration of usable heat (measured as heat obtained upon condensate of the steam generated) to work of compression 8.2 is obtained. With a 40% efficiency of the prime mover (i.e. 40% of the diesel fuel energy is converted to useful work), the contribution to the useful energy output of the primary energy source is only 30%. Without heat recovery from the prime mover, this becomes 33% while the generation of an equivalent amount of steam in a conventional steam boiler will require 100% of a primary energy source, i.e. and equivalent fuel.

I claim:

1. A method of generating steam from sensible low temperature waste heat of a carrier fluid, comprising the steps of:
    (a) heating feed water under pressure by passing it in heat exchange with said fluid;
    (b) expanding the heated feed water in a succession of pressure stages to successively lower pressures thereby producing steam in each of said stages;
    (c) compressing the steam of at least each pressure stage with a pressure lower than the highest pressure stage to the pressure of the next higher pressure stage; and
    (d) combining the compressed steam from each pressure stage at a pressure lower than the highest pressure stage with steam from the next higher pressure stage.

2. The method defined in claim 1, further comprising the step of withdrawing water from the stage of lowest pressure and pressurizing same, the pressurized water from said lowest pressure stage being heated in heat exchange with said fluid and thereafter expanded.

3. The method defined in claim 1 wherein water of at least two pressure stages is heated in heat exchange with uncooled fluid or fluid cooled in a pressure stage operating at higher pressure.

4. The method defined in claim 3 wherein a quantity of water is fed to the highest pressure stage which is equivalent at standard temperature and pressure to the quantity of steam generated.

5. The method defined in claim 1, further comprising the step of saturating the steam in at least some of said pressure stages by spraying water into same.

6. The method defined in claim 1 wherein the compression of the steam from the pressure stages is effected in respective compressor stages, said method further comprising the step of driving all of said compressor stages with a common shaft from a prime mover operated with a fuel, and recovering heat from the combustion of fuel for said prime mover and producing steam therewith.

7. An apparatus for generating steam comprising:
a plurality of pressure stages including a first high pressure stage and a last low pressure stage;
means for heating a feed water under pressure in heat exchange with a waste heat carrying fluid;
means for expanding said heated water in succession in said stages from the first stage to the last stage; and
a respective compressor stage between each succeeding pair of pressure stages for compressing steam from each stage of lower pressure to the pressure of the next stage at higher pressure and combining the compressed steam with the steam of the next stage of higher pressure.

8. The apparatus defined in claim 7 wherein each of said pressure stages has a liquid compartment, said apparatus further comprising a respective valve connecting each liquid compartment of a higher pressure stage with the liquid compartment of the next lower pressure stage.

9. The apparatus defined in claim 8 wherein each of said liquid compartments is provided with a respective heat exchanger, said fluid traversing said heat exchangers in series.

10. The apparatus defined in claim 8, further comprising a pump connected to said last pressure stage for recirculating water to said first pressure stage and pressuring the recirculated water, and a heat exchanger between said pump and said first pressure stage for heating said water in indirect heat exchange with said fluid.

11. The apparatus defined in claim 8 wherein said compressor stages are all driven by a common shaft, said apparatus further comprising a fuel-fired prime mover connected to said shaft, and means for generating steam from heat produced by the fuel of said prime mover.

12. The apparatus defined in claim 11 wherein said prime mover is a diesel engine having a water-cooling system, the last-mentioned means including means for circulating water from one of said pressure stages through said cooling system and back into another of said pressure stages, exhaust gas from said diesel engine being passed in heat exchange with a portion of water from one of said pressure stages for transforming same to steam.

* * * * *